United States Patent
Ouhadi et al.

(10) Patent No.: US 6,255,389 B1
(45) Date of Patent: Jul. 3, 2001

(54) STAR-BRANCHED RUBBER THERMOPLASTIC ELASTOMER VULCANIZATES

(75) Inventors: Trazollah Ouhadi, Liege (BE); Donald S. T. Wang; Paul A. Schacht, both of Akron, OH (US)

(73) Assignee: Advanced Elastomer Systems, L.P., Akron, OH (US)

( * ) Notice: Subject to any disclaimer, the term of this patent is extended or adjusted under 35 U.S.C. 154(b) by 0 days.

(21) Appl. No.: 09/141,223

(22) Filed: Aug. 27, 1998

(51) Int. Cl.$^7$ ............................ C08L 27/00; C08L 47/00
(52) U.S. Cl. ........................... 525/76; 525/86; 525/87
(58) Field of Search ...................... 525/70, 76, 86, 525/87

(56) References Cited

U.S. PATENT DOCUMENTS

| | | |
|---|---|---|
| 4,130,534 | 12/1978 | Coran et al. . |
| 4,444,952 * | 4/1984 | Feinberg et al. ................. 525/93 |
| 4,810,752 | 3/1989 | Bayan ............................ 525/98 |
| 4,916,180 | 4/1990 | Robinson et al. ................. 524/456 |
| 5,286,804 | 2/1994 | Powers et al. ................... 525/333.4 |
| 5,585,441 * | 12/1996 | Brandes et al. .................. 525/193 |

FOREIGN PATENT DOCUMENTS

| | | |
|---|---|---|
| 0 320 263 | 6/1989 | (EP) . |
| 0 448 902 | 10/1991 | (EP) . |
| 0 287 282 B1 | 9/1992 | (EP) . |
| 0 678 529 | 10/1995 | (EP) . |
| 0 320 263 B1 | 3/1996 | (EP) . |
| 875947 | 8/1961 | (GB) . |
| 01040556 * | 2/1989 | (JP) . |
| WO 91/13102 | 9/1991 | (WO) . |

OTHER PUBLICATIONS

"Star" Branched Butyl—A Novel Butyl Rubber for Improved Processability—I. Concepts, Structure and Synthesis. H–C Wang Et Al. Presentation at ACS Rubber Division, May 9–12, 1989.

"Star" Branched Butyl—A Novel Butyl Rubber for Improved Processability II. Properties and Applications. I. Dundevani Et Al. Presentation at ACS Rubber Division, May 9–12, 1989.

"Star" Branched Butyl—A Novel Butyl Rubber for Improved Processability—IV. Compounding and Vulcanization Latitude. L. Gursky Et Al. Presentation at ACS Rubber Division, Oct. 17–20, 1989.

Getlichermann et al. , Polym. Degrad. Stab. 43(3) 343–52, 1994.*

Stribeck et al., J. Appl. Crystallogr. 30 (5, pt, 2), 708–711, 1997*

Inoue, J. Appl. Polym. Sci. 54(6), 709–21, 1994.*

* cited by examiner

*Primary Examiner*—Jeffrey Mullis
(74) *Attorney, Agent, or Firm*—William A. Skinner

(57) ABSTRACT

The present invention relates to a curable composition comprising a thermoplastic polyolefin resin and a curable star-branched rubber, a thermoplastic elastomeric vulcanizate obtainable therefrom by dynamically vulcanizing said curable composition in the presence of a suitable curative and shaped articles comprising said vulcanizate.

12 Claims, 1 Drawing Sheet

Viscosity versus Shear Rate

STAR-BRANCHED RUBBER THERMOPLASTIC ELASTOMER VULCANIZATES

FIELD OF THE INVENTION

The present invention relates to a curable composition comprising a thermoplastic polyolefin resin and a curable star-branched rubber, a thermoplastic elastomeric vulcanizate obtainable therefrom by dynamically vulcanizing said curable composition in the presence of suitable curative. The invention further relates to shaped articles comprising said vulcanizate.

BACKGROUND/PRIOR ART

Polymer blends which have a combination of both, thermoplastic and elastic properties (thermoplastic elastomers, TPE) are generally obtained by blending a thermoplastic polyolefin with an elastomeric composition (rubber) in a way such that the elastomer is intimately and uniformly dispersed as a discrete particulate phase within a continuous phase of the thermoplastic. Early work with vulcanized compositions is found in U.S. Pat. No. 3,037,954 to Gessler which discloses static vulcanization as well as the technique of dynamic vulcanization wherein a vulcanizable elastomer is dispersed into a resinous thermoplastic polymer and the elastomer is cured while continuously mixing and shearing the polymer blend. The resulting composition (thermoplastic elastomer vulcanizate "TPV") is a microgel dispersion of cured elastomer, such as butyl rubber, chlorinated butyl rubber, polybutadiene or polyisobutene in an uncured matrix of thermoplastic polymer such as polypropylene. Since then the technology has advanced significantly.

U.S. Pat. No. 3,037,954 discloses compositions comprising polypropylene and a rubber such as, inter alia, butyl rubber, chlorinated butyl rubber, polybutadiene, polychloroprene and polyisobutene.

U.S. Pat. Nos. 3,758,643 and 3,806,558 disclose polymer blends comprising an olefin thermoplastic resin and an olefin copolymer rubber wherein the rubber is dynamically cured to a partial cure state. The compositions can be reprocessed, however, the potential applications of such blends are limited by their high compression set and/or low softening temperature resulting from only a partial cure of the rubber. Furthermore, the partial peroxide cure utilized in such blends is difficult to control from the standpoint of completeness of reaction, resulting in batch to batch variations in product properties.

Japanese Patent Application 85,530/87 discloses a DVA composition including a crystalline polypropylene as a matrix and two elastomers: a bromobutyl rubber and an olefin copolymer rubber such as EPM or EPDM rubber.

U.S. Pat. No. 4,130,5334 discloses elastoplastic compositions comprising blends of cross-linked butyl rubber and a thermoplastic polyolefin resin. The blends disclosed comprise about 20 to 45 parts by weight of the thermoplastic crystalline polyolefin resin and from 80 to 55 parts by weight of butyl rubber, chlorobutyl rubber or bromobutyl rubber, per 100 weight parts of polyolefin and rubber.

U.S. Pat. No. 4,810,752 discloses a thermoplastic elastomer composition comprising a halobutyl rubber which is cured in the presence of a mixture of a polyolefin and a thermoplastic elastomeric block copolymer such as SIS, SEBS or SBS.

U.S. Pat. No. 4,916,180 discloses a thermoplastic elastomer composition comprising a butyl terpolymer rubber and polypropylene. The rubber is cured with a peroxide curing agent. Said butyl terpolymer comprises a major portion of isobutylene, a major portion of isoprene and a minor portion of a divinyl aromatic monomer of the formula R—CR=CR—X—CR=CR—R in which X is an aromatic nucleus and R is independently selected from hydrogen or $C_{1-5}$ alkyl.

European patent application 0 320 263 (published on Jun 14, 1989) discloses the introduction of branching into $C_4$ to $C_7$ isoolefin homopolymer rubber, butyl copolymer rubber, halogenated copolymer rubber ($C_4$ to $C_7$ isoolefin/$C_4$ to $C_{14}$-conjugated diene), and mixtures thereof by reaction with a functional agent, i.e., a branching agent for the purpose of modifying the molecular weight distribution. The modification of the molecular weight distribution of said rubbers is achieved by incorporating during polymerization of the polymers an effective amount of a functional reagent selected from the group consisting of polymers and copolymers comprising functional groups capable of copolymerizing or forming a chemical bond with the product polymer, the functional group comprising cationically active halogen or cationically active unsaturation and such polymers and copolymers preferably comprising lyophilic polymerization diluent soluble moiety. The copolymers thus obtained are called "star-branched copolymer rubbers" or "star-branched butyl rubbers" and may be halogenated.

U.S. Pat. No. 5,286,804 and the International Patent Application Publication WO 91/13102 disclose an improved process for halogenating star-branched butyl rubbers.

The thermoplastic elastomer vulcanizates based on butyl and halogenated butyl rubbers known in the art, however, show limitations with respect to the balance of physical properties (tensile strength, elongation at break) and processability, i.e., allowing to obtain shaped articles after injection-molding, extrusion and blow-molding which show no defect, such as on the surface, at the edges, etc. Also the manufacturing process of these butyl and halogenated butyl rubber based thermoplastic elastomers has been found to be difficult and complicated and requires intensive mixing.

It is an object of the present invention to provide curable composition which comprises a thermoplastic polyolefin resin and a rubber which can be converted into a thermoplastic elastomer vulcanizate which has an improved balance of physical properties and superior processability. In detail it is an object of the present invention to provide a thermoplastic elastomer based on not only butyl but also halogenated derivatives which is easy to be manufactured and easy to be processed using all the processing devices like extrusion, injection molding, blow molding, etc. with excellent articles aspects.

DESCRIPTION OF THE INVENTION

It has surprisingly been found that blends of a thermoplastic polyolefin resin and a curable star-branched rubber (copolymer) when dynamically cured in the presence of a suitable curative or curative system yields a better processability and the articles comprising the cured vulcanizate show a smoother surface (higher surface rating) compared to conventional butyl rubbers or halogenated butyl rubbers. The quality of extrusion which is a key parameter for the commercial success of a thermoplastic elastomer has been found to be improved significantly.

The thermoplastic elastomers of the present invention have the well-known functional properties inherent to conventional butyl rubber like impermeability, heat/flex resistance and damping equivalent to thermoplastic elastomers made with traditional butyl rubbers.

In detail, the present invention relates to a curable composition comprising a blend of (i) a thermoplastic polyolefin resin; and (ii) a curable star-branched rubber.

Furthermore, the present invention relates to a thermoplastic elastomer vulcanizate obtainable from the curable composition as defined above by dynamically curing the rubber in the presence of a suitable curative or curative system under conditions of shear at a temperature above the melting temperature of the thermoplastic component.

BRIEF DESCRIPTION OF THE FIGURE

The FIGURE illustrates the improvement of the rheology-property of the star-branched rubber TVP's according to the invention (lower two lines in the graph) in comparison to rubber TPV's containing conventional rubbers (upper two lines in the graph). For each kind of rubber (star-branched and conventional rubber) two different polypropylenes were used.

THERMOPLASTIC POLYOLEFIN RESIN

Figure 1:
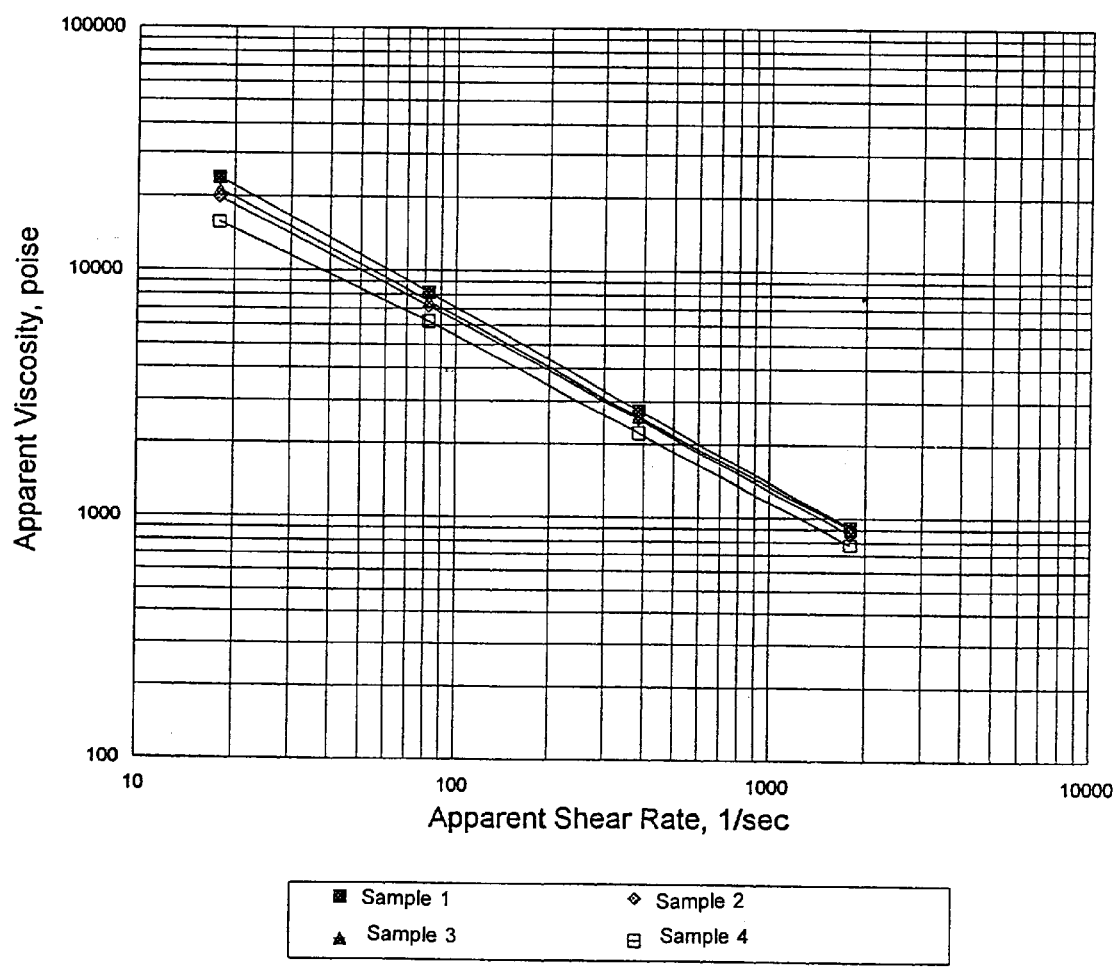

Polyolefins suitable for use in the thermoplastic elastomer blends of the invention include thermoplastic, crystalline polyolefin homopolymers and copolymers. They are desirably prepared from monoolefin monomers having 2 to 7 carbon atoms, such as ethylene, propylene, 1-butene, isobutylene, 1-pentene, 1-hexene, 1-octene, 3-methyl-1-pentene, 4-methyl-1-pentene, 5-methyl-1-hexene, mixtures thereof and copolymers thereof with (meth)acrylates and/or vinyl acetates. Preferred, however, are monomers having 3 to 6 carbon atoms, with propylene being most preferred. As used in the specification and claims the term polypropylene (PP) includes homopolymers of propylene as well as reactor copolymers of polypropylene which can contain about 1 to about 40% by weight of ethylene or an α-olefin comonomer of 4 to 16 carbon atoms, and mixtures thereof. Random propylene copolymer with one or more co-monomers selected from ethylene or an α-olefin having 4 to 16 carbon atoms can be used alone or/and with other polypropylenes described above. The polypropylene can be highly crystalline isotactic or syndiotactic polypropylene. The polypropylene used for this invention can be made via either a Ziegler-Natta or single site catalysis system. Commercially available polyolefins may be used in the practice of the invention. Further polyolefins which can be used in terms of the invention are high, low, linear-low, very low density (including those made with single-site catalyst system) polyethylenes and copolymers of ethylene with (meth)acrylates and/or vinyl acetates.

Star-branched Rubber

In the following "star-branched rubber" is used interchangeably with "star-branched copolymer" or "star-branched copolymer rubber". In the art star-branched rubbers are often called "star-branched butyl rubber" or "star-branched butyl". Star-branched rubbers, the halogenation thereof, their methods of preparation and further technological background is disclosed in detail in European Patent Application EP-0 320 263, in Paper No. 21 entitled "Star-branched Butyl, A Novel Butyl Rubber For Improved Processability" presented at the Rubber Division of the American Chemical Society, Mexico City, Mexico, 9–12 May, 1989 by H. C. Wang and the references cited therein. Furthermore, reference is made to U.S. Pat. No. 5,286,804 and the International Patent Application Publication WO 91/13102 and the references cited therein. The content of all of the above references is incorporated herein by reference. The star-branched rubbers contain long branched structures by incorporating, during polymerization of the $C_4$ to $C_{14}$ multiolefin, an effective amount of a cationically functional reagent selected from the group consisting of polymers and copolymers comprising functional groups capable of copolymerizing or forming a chemical bond with the product polymer, the functional group comprising cationically active halogen or cationically active unsaturation an such polymers and copolymers preferably comprising lyophilic polymerization diluent soluble moiety.

Classes of functional polymeric reagents which are useful for obtaining the star-branched rubbers are represented by the following formulae (I) to (III):

$$-[-R_4-CR_1=CR_2-CR_3X-R_5-]-_m \quad (I)$$

wherein $R_1$, $R_2$ and $R_3$ independently represent hydrogen or a $C_1$ to $C_{15}$, preferably $C_1$ to $C_4$ alkyl group, $R_4$ and $R_5$ independently represent a $C_1$ to $C_{15}$, preferably $C_1$ to $C_4$ alkylene group, X represents halogen, preferably chlorine or bromine, m represents an integer of 4 to 100.

Most preferred for the alkyl groups $R_1$ to $R_3$ are the methyl and ethyl group and for $R_4$ and $R_5$ the methylene and ethylene group.

Suitable reagents in this class include chlorinated butyl and brominated butyl.

$$-[-R_4-CR_6X-R_5-]-_n \quad (II)$$

wherein $R_6$ represents a $C_1$ to $C_{15}$, alkyl group preferably $C_1$ to $C_4$ alkyl or an aryl group containing up to 14, preferably up to 9 carbon atoms, $R_4$, $R_5$ and X are as defined above in context with formula (I), n represents an integer of 4 to 100.

Most preferred aryl groups for $R_1$ are the phenyl or tolyl group.

Suitable reagents in this class include hydrochlorinated polyisoprene, hydrobrominated polyisoprene, isobutylene-vinylbenzyl chloride copolymer and chlorinated polystyrene.

$$-[-R_4-CR_7=CR_8-R_5-]-_p \quad (III)$$

wherein $R_7$ and $R_8$ independently represent hydrogen, a $C_1$ to $C_{15}$, preferably $C_1$ to $C_4$ alkyl, an aryl group containing up to 14, preferably up to 9 carbon atoms or an $C_2$ to $C_4$ alkenyl group, $R_4$ and $R_5$ are as defined above in context with formula (I), represents an integer of 7 to 1,000.

The most preferred alkenyl groups for $R_7$ and $R_8$ are ethenyl and propenyl.

Suitable reagents in this class include polybutadiene, polyisoprene and polypiperylene.

More specifically, said cationically functional reagent comprising a cationically active unsaturation comprises a polydiene and partially hydrogenated polydiene selected from the group consisting of polybutadiene, polyisoprene, polypiperylene, natural rubber, styrene-butadiene rubber, ethylene-propylene diene monomer rubber, styrene-butad ienestyrene and styrene-isoprene-styrene block copolymers. More preferably said reagent further comprises a lyophilic poly-merization diluent soluble portion. Examples comprise polystyrene comprising cationically active halogen functionality, or a hydrohalogenated styrene-isoprene-styrene triblock polymer, wherein said triblock polymer preferably has a number average molecular weight of from about 100,000 to about 300,000 the central polyisoprene block prior to hydrohalogenation comprises from about 1 to about 10 weight percent of said triblock polymer and following hydrohalogenation contains from about 0.1 to about 1.0 weight percent halogen.

The reactive branching agents for use in producing the star-branched polymers are present during polymerization of the isomonoolefin and the multiolefin monomers. Generally, such agents are present in an amount based on said monomers, greater than about 0.3 weight percent, e.g., about 0.3 to about 3.0 weight percent, preferably greater than about 0.35 weight percent, e.g., about 0.35 to about 2.8 weight percent, more preferably greater than about 0.4 to about 2.7 weight percent, e.g., about 0.45 to about 2.6 weight percent, for example greater than about 0.5 weight percent, e.g., about 0.5 to about 2.5 weight percent. Reagents which are not excessively reactive can be used in a commercial process, at e.g., about 1.1 to about 2.0 weight percent. The star-branched rubber may be further halogenated as described in U.S. Pat. No. 5,286,804 or the International Patent Application Publication WO 91/13102 and may contain chemically bound chlorine, bromine or iodine. The rubber may comprise from about 0.05 to about 5 weight percent of chemically bound halogen. When the halogen is chlorine, the preferred amount of chemically bound chlorine ranges from about 0.1 to about 2.0 weight percent. When the halogen is bromine, the preferred amount of chemically bound bromine ranges from about 0.2 to about 4.0 weight percent. The star-branched rubber contains less than 30% by weight of the conjugated multiolefin based on the total amount of isomonoolefin and conjugated multiolefin. Preferably star-branched rubber comprises about 85 to 99.5% by weight of the $C_4$ to $C_7$ isomonoolefin and 15 to 0.5% by weight of the multiolefin, based on the amount of the isomonoolefin and multiolefin (feed blend). A preferred $C_4$ to $C_7$ isomonoolefin is isobutylene, preferred $C_4$ to $C_{14}$ multiolefins are selected from isoprene, butadiene, dimethylbutadiene and piperylene. Instead of the $C_4$ to $C_{14}$ multiolefins para-$C_1$ to $C_4$-alkyl styrene or, preferably its halogenated derivative containing 0.1 to 10% by weight of halogen such as chlorine or bromine can be used as well.

The blend comprising the thermoplastic polyolefin resin (i) and the curable star-branched rubber (ii) comprises 15 to 80% by weight, preferably 18 to 65% by weight, more preferably 22 to 55% by weight of the thermoplastic polyolefin resin (i) and 85 to 20% by weight, preferably 82 to 35% by weight, more preferably 78 to 45% by weight of the curable star-branched rubber (ii), based on the amount of (i) and (ii). The same amounts are true for the vulcanizate in which the curable star-branched rubber has partially or fully been cured by a suitable curative or curative system as described below.

Additives

In addition to its polymer component, i.e., the thermoplastic polyolefin resin and the star-branched rubber the thermoplastic elastomer vulcanizate (TPV) composition of this invention may include as an additive reinforcing and non-reinforcing fillers, antioxidants, stabilizers, rubber processing oils, rubber/thermoplastic phase compatibilizing agents, lubricants (e.g., oleamide), antiblocking agents, antistatic agents, waxes, coupling agents for the fillers and/or pigment, foaming agents, pigments, flame retardants, and other processing aids known to the rubber compounding art. The pigments and fillers can comprise up to 50 wt % of the total vulcanized composition, based on polymer components and additives, preferably pigments and fillers comprise about up to 40 wt % of the total composition. The total amount of additives, including pigments and fillers, may be up to 70 wt %, based on the total composition.

Fillers can be inorganic fillers such as calcium carbonate, clays, silica, talc, titanium dioxide or carbon black. Any type of carbon black can be used, such as channel blacks, furnace blacks, thermal blacks, acetylene black, lamp black and the like.

Rubber process oils have particular ASTM designations depending on whether they fall into the class of paraffinic, naphthenic or aromatic process oils. They are derived from petroleum fractions. The type of process oil utilized will be that customarily used in conjunction with the rubber component. The ordinarily skilled rubber chemist will recognize which type of oil should be utilized with a particular rubber. The quantity of rubber process oil utilized is based on the total rubber content, both cured and uncured, and can be defined as the ratio, by weight, of process oil to the total rubber in the TPV. This ratio can vary from about 0 to about 4/1; preferably about 0.4/1 to about 3.5/1; more preferably about 0.8/1 to about 3.2/1. Larger amounts of process oil can be used, the resultant effect being reduced physical strength of the composition. Oils other than petroleum based oils, such as oils derived from coal tar and pine tar, can also be utilized. In addition to the petroleum derived rubber process oils, organic esters and other synthetic plasticizers can be used. Furthermore, the low molecular weight synthetic polyolefins like α-olefinic process oil, low molecular weight polybutene, etc. can be used as process oil.

The ratio of the process oil defined above includes the extending oil which may be contained in rubber plus additional oil added during the manufacture of the thermoplastic elastomer.

Antioxidants can be utilized in the composition of this invention. The particular antioxidant utilized will depend on the rubbers utilized and more than one type may be required. Their proper selection is well within the ordinary skill of the rubber and thermoplastic processing chemist. Antioxidants will generally fall into the class of chemical protectors or physical protectors.

Physical protectors are used where there is to be little movement in the part to be manufactured from the composition. The physical antioxidants include mixed petroleum waxes and microcrystalline waxes. These generally waxy materials impart a "bloom" to the surface of the rubber part and form a protective coating to shield the part from oxygen, ozone, etc.

The chemical protectors generally fall into three chemical groups; secondary amines, phenolics and phosphites. Illustrative, non-limiting examples of types of antioxidants useful in the practice of this invention are hindered phenols, amino phenols, hydroquinones, alkyldiamines, amine condensation products, etc. Further non-limiting examples of these and other types of antioxidants are styrenated phenol; 2,2'-methylene-bis-(4-methyl-6-t-butylphenol); 2,6'-di-t-butyl-o-di-methylamino-p-cresol; hydroquinone monobenzyl ether, octylated diphenyl amine; phenyl-beta-naphthylamine; N,N'-diphenylethylene diamine; aldol-alpha-naphthylamine; N,N'-diphenyl-p-phenylene diamine, and the like.

Curing System

The composition of the invention, the rubber component of the TPV will be partially or fully vulcanized/crosslinked. Those of ordinary skill in the art will appreciate the appropriate quantities, types of cure systems and vulcanization conditions required to carry out the partial or full vulcanization of the rubber. The rubber can be vulcanized using varying amounts of curative, varying temperatures and varying time of cure in order to obtain the optimum partial or full crosslinking desired. Any known cure system can be used, so long as it is suitable under the vulcanization conditions for the rubber being used and is compatible with the thermoplastic polyolefin resin component of the TPV. These curatives include sulfur, sulfur donors, metal oxides, resin systems, high energy radiation and the like, both with and without accelerators and co-agents.

Organic peroxides with an adequate well-known co-agent can be used as cure system except where the butyl rubber is a non-halogenated butyl rubber. The role of the co-agent in peroxide cure systems is to enhance the cure-state and inhibiting chain-fragmentation or scission effect. Specific examples of useful organic peroxides are selected from octanoyl peroxide, lauroyl peroxide, benzoyl peroxide, tert.-butyl peroctoate, p-chlorobenzoyl peroxide, 2,4-dicholorbenzoyl peroxide, cyclohexanone peroxide, tert.-butyl peroxybenzoate, methyl ethyl ketone peroxide, dicumyl peroxide, di-tert.-butyl peroxide, 2,5-dimethyl-2,5-di(benzoylperoxy)hexane 2,5-dimethyl-2,5-di(tert.-butylperoxy)hexane, di-tert.-butyl diperoxyphthalate, tert.-butylcumyl peroxide, diisopropylbenzene hydroperoxide, 1,3-bis(tert.-butylperoxyisopropyl)benzene tert.-butyl peroxy-pivalate, 3,5,5-trimethylhexanoyl peroxide, 1,1-bis(tert.-butyl-peroxy)-3,5,5-trimethylcyclohexane, 1,1-bis(tert.-butyl-peroxy)cyclohexane, etc.; azo compounds such as azobisisobutyronitrile, and the like.

The peroxide-based cure systems may be used with or without co-agents such as ethylene dimethacrylate, polyethylene glycol dimethacrylate, trimethylol propane trimethacrylate, divinyl benzene, diallyl itaconate, triallyl cyanurate, diallyl phthalate, allyl methacrylate, cyclohexyl methacrylate, m-phenylene bis maleimide (HVA-2), and the like.

Phenolic resin curatives are preferred for the preparation of the thermoplastic elastomer vulcanizate of the invention, and such cure systems are well known in the art and literature of vulcanization of rubbers. Their use in vulcanized compositions is more fully described in U.S. Pat. No. 4,311,628, the disclosure of which is fully incorporated herein by this reference.

A basic ingredient of such system is a phenolic curing resin made by condensation of halogen substituted phenol, $C_1$–$C_{10}$ alkyl substituted phenol or unsubstituted phenol with an aldehyde, preferably, formaldehyde, in an alkaline medium or by condensation of bifunctional phenoldialcohols. Dimethylol phenols substituted in the para-position with $C_5$–$C_{10}$ alkyl groups are preferred. Halogenated alkyl substituted phenol curing resins prepared by halogenation of alkyl substituted phenol curing resin are also especially suitable. Phenolic curative systems comprising methylol phenolic resins, halogen donor and metal compound are especially recommended, details of which are described in Giller, U.S. Pat. No. 3,287,440 and Gerstin et al, U.S. Pat. No. 3,709,840. Non-halogenated phenol curing resins are used in conjunction with halogen donors, preferably, along with a hydrogen halide scavenger. Ordinarily, halogenated, preferably brominated, phenolic resins containing 2–10 weight percent bromine, do not require halogen donor but are used in conjunction with a hydrogen halide scavenger such as metal oxides such as iron oxide, titanium oxide, magnesium oxide, magnesium silicate, silicon dioxide and preferably zinc oxide, the presence of which promotes the crosslinking function of the phenolic resin, however, with rubbers which do not readily cure with phenolic resins, the conjoint use of a halogen donor and zinc oxide is recommended. The preparation of halogenated phenol resins and their use in a curative system with zinc oxide are described in U.S. Pat. Nos. 2,972,600 and 3,093,613, the disclosure of which along with the disclosure of the aforesaid Giller and Gerstin patents are incorporated herein by reference. Examples of suitable halogen donors are stannous chloride, ferric chloride, or halogen donating polymers such as chlorinated paraffin, chlorinated polyethylene, chlorosulfonated polyethylene, and polychlorobutadiene (neoprene rubber). The term "activator" as used herein means any material which materially increases the cross-linking efficiency of the phenolic curing resin and includes metal oxides and halogen donors either used alone or conjointly. For further details of phenolic curative systems see "Vulcanization and Vulcanizing Agents," W. Hoffman, Palmerton Publishing Company. Suitable phenolic curing resins and brominated phenolic curing resins are commercially available, for example, such resins may be purchased under the trade names SP-1045, CRJ-352, SP-1055 and SP-1056 from Schenectady Chemicals, Inc. Similar functionally equivalent phenolic curing resins may be obtained from other suppliers. As explained above, sufficient quantities of curatives are used to achieve essentially complete cure of the rubber.

For halogenated butyl rubbers, a preferred cure system is one which is based on ZnO and/or MgO. In this system, the MgO does not act as an activator but as an acid acceptor to stabilize the rubber from dehydrohalogenation.

Another preferred cure system for halogenated butyl rubbers comprises ZnO and a maleimide product. Among the maleimide product, a bismaleimide is especially superior in effectiveness and m-phenylene bismaleimide (4,4'-m-phenylene bismaleimide) (HVA-2) preferred. Other examples of the bismaleimide are 4,4'-vinylenediphenyl bismaleimide, p-phenylene bismaleimide, 4,4'-sulfonyldiphenyl bismaleimide, 2,2'-dithiodiphenyl bismaleimide, 4,4'-ethylene-bis-oxophenyl bismaleimide, 3,3'-dichloro-4,4'-biphenyl bismaleimide, o-phenylene bismaleimide, hexamethylene bismaleimide and 3,6-durine bismaleimides. Usually about 1 to about 15 weight parts of the curative or curative system are used per 100 weight parts of the rubber to be cured.

General Procedure

The rubber component of the thermoplastic elastomer vulcanizate is generally present as small, i.e., micro-size, particles within a continuous polyolefin resin matrix, although a co-continuous morphology is also possible depending on the amount of rubber relative to plastic with or without rubber curing, and the cure system or if the rubber is cured, the degree of cure of the rubber. The rubber is partially or fully crosslinked/cured, preferably the rubber is fully crosslinked.

The full crosslinking can be achieved by adding an appropriate rubber curative or curative system to the blend of thermoplastic polyolefin resin and the rubber and vulcanizing the rubber to the desired degree under conventional vulcanizing conditions. However, it is preferred that the rubber be crosslinked by the process of dynamic vulcanization. As used in the specification and claims, the term "dynamic vulcanization" means a vulcanization or curing process for a rubber contained in a thermoplastic elastomer composition, wherein the curable rubber is vulcanized under conditions of high shear at a temperature above the melting point of the thermoplastic polyolefin component. The rubber is thus simultaneously crosslinked and dispersed as fine particles within the polyolefin matrix, although as noted above, other morphologies may also exist. Dynamic vulcanization is effected by mixing the thermoplastic elastomer components at elevated temperature in the presence of a rubber curative in conventional mixing equipment such as roll mills, Banbury mixers, Brabender mixers, continuous mixers, mixing extruders such as single and twin-screw extruders and the like. Thereby the dynamically partially or fully vulcanized rubber/plastic alloy is obtained. The unique characteristic of dynamically cured compositions is that, notwithstanding the fact that the rubber component is preferably fully cured, the compositions can be processed and reprocessed by conventional plastic processing techniques such as extrusion, injection molding and compression molding. Scrap or flashing can be salvaged and reprocessed.

Preferably, after the thermoplastic terpolymer and rubber are intimately mixed, the curative is added. Heating and masticating at vulcanization temperatures are generally adequate to complete the vulcanization reaction in a few minutes or less, but if shorter vulcanization times are desired, higher temperatures may be used. A suitable range of vulcanization temperature is from about the melting temperature of the thermoplastic terpolymer, i.e., between 120° C. to about 250° C. or more. Typically, the range is from about 150° C. to about 225° C. A preferred range of vulcanization temperatures is from about 180° C. to about 220° C. To obtain thermoplastic elastomer vulcanizates, it is important that mixing continues without interruption until vulcanization occurs. Mixing is continued until a maximum mixing torque indicates that vulcanization has occurred. The vulcanized composition is then removed from the mixer. The vulcanized composition then can further be processed as mentioned above.

The term "partially vulcanized" as used herein means that not all of the rubber component capable of being cured has been cured. The term "fully vulcanized" as used herein means that the rubber component to be vulcanized has been cured to a state in which the elastomeric properties of the crosslinked rubber are similar to those of the rubber in its conventional vulcanized state, apart from the thermoplastic elastomer composition. Simply stated, fully vulcanized means that all of the rubber component which is capable of being vulcanized, has been vulcanized (cured). The degree of cure can be described in ferms of gel content or conversely, extractable components. Alternatively the degree of cure may be expressed in terms of crosslink density. All of these descriptions are well known in the art, for example from U.S. Pat. No. 5,100,947 and U.S. Pat. No. 5,157,081.

The modified thermoplastic elastomer vulcanizate of the present invention is used in processes for making shaped articles by conventional processing such as co-injection, co-extrusion, blow-molding, co-blow-molding (injection and extrusion), lamination, calendering, overmolding by injection and compression, and over-extrusion.

The invention will be better understood by reference to the following examples which serve to illustrate but not limit the present invention.

Unless otherwise indicated throughout this invention weight parts or % by weight are used to characterize the compositions.

EXAMPLES

The following compounds were used in the experiments:
Exxon Butyl 268:
 conventional isoprene-isobutylene rubber, 46–55 Mooney viscosity (1+8) 125° C. from Exxon Chemical;
Exxon SB Butyl 4268 and MDB 90/4:
 star-branched butyl rubber, copolymer of isobutylene and isoprene, including a styrene-butadiene rubber (SBR) copolymer branching agent, available from Exxon Chemical under Grade 4268 and MDB 90/4, respectively with 34–44 and Mooney viscosity 40 (1+8) 125° C.;
Exxon SB Chlorobutyl 5066 and MDB 88/4:
 chlorinated star-branched butyl rubbers, chlorinated copolymer of isobutylene and isoprene, including a styrene-butadiene rubber (SBR) copolymer branching agent, available from Exxon Chemical under Grade 5066 and MDB 88/4, respectively with 35–45 and 40 Mooney viscosity (1+8) 125° C.;
Exxon SB Bromobutyl 6255 Rubber:
 brominated star-branched butyl rubber, brominated copolymer of isobutylene and isoprene, including a styrene-butadiene rubber (SBR) copolymer branching agent, available from Exxon Chemical under Grade 6255 with 41–51 Mooney viscosity (1+8) 125° C.;
Exxon bromobutyl 2244 Rubber: brominated isoprene-isobutylene rubber, 41–51
 Mooney viscosity (1+8) 125° C.; Aristech TI 4007 G Polypropylene: polypropylene reactor copolymer, MFI=0.75 (dg/min., 230° C.) from Aristech;
 Exxon PP 7032 Polypropylene: reactor polypropylene copolymer, MFI=4 (dg/min., 230° C.) from Exxon Chemical;
 Lyondell 51507A Polypropylene: homo polypropylene from Lyondell;
 Aristech D 00814 Polypropylene: homo polypropylene from Aristech;
 Exxon Escorez 5320 Hydrocarbon: synthetic hydrocarbon resin from Exxon Chemical;
 Translink 37 Clay: calcinated and surface modified kaolin from KMG Mineral, Inc.;
 Maglite D MgO: Magnesium oxide from C.P. HALL Co.;
 Stearic Acid F 100: long chain fatty acid (any source);
 Irganox 3114: tris(3,5-di-tert.-butyl-4-hydroxybenzyl isocyanurate antioxidant from CIBA-Geigy;
 Ultranox 626: bis(2,4-di-t-butylphenyl)pentarylthritol phosphite from Borg Warner;
 Exxon Chlorobutyl 1068: chlorinated isoprene-isobutylene, 33-43 Mooney viscosity (1+8) 125° C.;
 Exxon Parapol 950: low molecular weight polyisobutylene frdm Exxon Chemical (viscosity: 193–247 cSt at 100° C.);
 ZnO: zinc oxide (any source);
 Aristech FP 200F Polypropylene: homo polypropylene, MFI=20 (dg/min., 230° C.);
 Exxon Vistalon 808: ethylene-propylene copolymer rubber, 77 wt. % ethylene,
 Mooney viscosity (1+8) 125° C. from Exxon Chemical;
 HVA-2: N,N-m-phenylene dimaleimide: from Du Pont;
 Lyondell Arco Prime 350 White Oil: extracted paraffinic process oil from Lyondell;
 Icecap K Clay: aluminum silicate from Burgess Pigment;

Pro Flow 100: LMWPP, available from Poly Visions, Inc.;

Rexene FDO D 100: homo-polypropylene, MFI=14 (dg/min., 230° C.) from Rexene;

Optema TC 140: ethylene methylacrylate copolymer, 21.5% methylacrylate, MFI=135 (ASTM D-1238) from Exxon Chemical;

$SnCl_2$: tin chloride monohydrate (any source);

SP-1045: alkyl phenol formaldehyde from Schenectady;

Sunpar 150 M: mineral paraffinic process oil from Sun Oil Company;

DC-200 (Food Grade): dimethyl polysiloxane with 350 cSt viscosity from Dow Corning;

Plasthall 4141: triethylene glycol caprate-caprylate available from C.P. Hall Company;

Kemamide U: oleamide from Humko Chemical Division;

Kemamide S: stearamide from Humko Chemical Division;

CB 1068: chlorinated butyl rubber, chlorinated copolymer of isobutylene and iso-prene available from Exxon Chemical with 35–45 Mooney viscosity (1+8) 125° C.

PPH 1050: homo polypropylene, MFI=0.3 (dg/min) from Hoechst;

Neutral 600: extracted paraffinic oil from Exxon Chemical;

SRF 762: carbon black from Cabot;

HVA-2: N,N-m-phenylene dimaleimide from Du Pont;

Unislip 1757: fatty acid-amide from Unichema;

Vistalon 808: ethylene-propylene copolymer rubber, 77 wt. % ethylene, Mooney viscosity (1+8) 125° C. from Exxon Chemical;

The following measurement methods (standards) were used:

Hardness (Shore A): ISO 868-85 or ASTM D2240

Elongation at break (EB): DIN 53504 or ASTM D412

Ultimate tensile strength (UTS): DIN 53504 or ASTM D412

Mod. 100: Modulus at 100% elongation: DIN 53504 orASTM D412

Tension set: ASTM D412

ACR viscosity: Automatic Capilary Rheometer is a test method according to TPE-0137 (Advanced Elastomer Systems internal test) similar to ASTM-3835-93a. This test is operating at constant shear stress at 204° C. using a die with L/D=0.031.

Extrusion Surface Rating: Test method according to TPE-0106 (Advanced Elastomer Systems internal test), similar to ANSI (American National Standards Institute) B 46.1 "Surface Texture . . . ". The product to be evaluated is extruded into strips under standard conditions: A 2.54 cm or 3.81 cm diameter extruder, equipped with a 24:1 L/D screw having a 3–3.5 compression ratio is used. The extruder is fitted with a strip die 25.4 mm wide×0.5 mm thick×7–10 mm land length. Breaker plate is used with the die. Temperature set is: 180° C. (feed zone), 190° C., 200° C., 205° C. (die zone).

The surface smoothness of the extruded strip is measured with a stylus profilometer. The arithmetic average of the surface irregularity (Ra) is used to qualify surface smoothness. The smaller the value, the better the surface smoothness.

Tear strength: ASTM D624 die C

Compression set: ISO 815 type B

Mod. 300: Modulus at 300% elongation: DIN 53504 or ASTM D412

Experimentation:

A thermoplastic vulcanizate (TPV) can be made by dynamically curing a star branched butyl rubber (SBB) or star branched halogenated butyl rubber in the presence of the melted polypropylene plastic. The product offers improved processability (lower viscosity & smoother surface finishing) versus regular butyl/PP TPV. Table 1 shows a comparison property of the SB-butyl (4268)/PP TPV with the regular butyl (268)/PP TPV in an SP-1045 cured system. It is found that the ACR viscosity has significantly been reduced and the Extrusion Surface Rating (ESR) properties have been drastically improved (reduced) when the rubber phase is a star branched butyl rubber in comparison to a normal butyl rubber. In another series of experiments using star branched butyl rubber (Br-SBB) (6255) versus traditional butyl rubber with HVA-2 as cure system, the same trend has been found as shown in Table 2. In these experiments, different PP's have been evaluated with both types of butyl rubbers.

The rheology-property of the SBB-TPV (shear viscosity) were also found to be improved as is evident from the following data:

| | VISCOSITY vs. SHEAR RATE | | | |
| | Apparent Viscosity, Pa · s (poise) | | | |
|---|---|---|---|---|
| Apparent Shear Rate | $18\ s^{-1}$ | $82\ s^{-1}$ | $387\ s^{-1}$ | $1800\ s^{-1}$ |
| Sample 1* | 2383.5 (23835) | 815.8 (8158) | 274.7 (2747) | 91.7 (917) |
| Sample 2* | 1977.8 (19778) | 716.6 (7166) | 251.2 (2512) | 86.2 (862) |
| Sample 3* | 2129.9 (21299) | 749.7 (7497) | 258.3 (2583) | 89.7 (897) |
| Sample 4* | 1572.1 (15721) | 617.4 (6174) | 220.7 (2207) | 78.1 (781) |

*see Table 1 below

The experimental result is further illustrated by FIG. 1.

TABLE 1

| | Star-Branched Butyl Rubber/PP TPVs | | | | | | | |
|---|---|---|---|---|---|---|---|---|
| Sample Ingredients | 1 wt. % | 2 wt. % | 3 wt. % | 4 wt. % | 5 wt. % | 6 wt. % | 7 wt. % | 8 wt. % |
| Exxon Butyl 268 | 54.67 | | 54.67 | | 40.72 | | 40.72 | |
| Exxon SB Butyl 4268 Rubber | | 54.67 | | 54.67 | | 40.72 | | 40.72 |
| Icecap K Clay | 5.47 | 5.47 | 5.47 | 5.47 | 4.07 | 4.07 | 4.07 | 4.07 |
| Exxon PP7032 (Copo, 4 MFI) | 5.47 | 5.47 | 8.20 | 8.20 | 16.29 | 16.29 | 16.29 | 16.29 |

TABLE 1-continued

Star-Branched Butyl Rubber/PP TPVs

| Sample Ingredients | 1 wt. % | 2 wt. % | 3 wt. % | 4 wt. % | 5 wt. % | 6 wt. % | 7 wt. % | 8 wt. % |
|---|---|---|---|---|---|---|---|---|
| ProFlow 1000 (LMWPP) | 5.47 | 5.47 | 8.20 | 8.20 | | | | |
| Rexene FPO D100 (Homo-PP, 14 MFI) | 5.47 | 5.47 | | | 4.07 | 4.07 | 40.07 | 4.07 |
| Optema TC 140 (EMA, 21.5% MA, 135 MFI) | 10.93 | 10.93 | 10.93 | 10.93 | 8.14 | 8.14 | 8.14 | 8.14 |
| ZnO | 1.09 | 1.09 | 1.09 | 1.09 | 0.81 | 0.81 | 0.81 | 0.81 |
| $SnCl_2$ | 0.71 | 0.71 | 0.71 | 0.71 | 0.53 | 0.53 | 0.53 | 0.53 |
| SP-1045 | 2.73 | 2.73 | 2.73 | 2.73 | 2.04 | 2.04 | 2.04 | 2.04 |
| Sunpar 150M | | | | | 18.32 | 18.32 | | |
| DC-200 (Food Grade, 350 cSt.) | 3.99 | 3.99 | 3.99 | 3.99 | | | | |
| Plasthall 4141 (Triethylene Glycol Caprate-Caprylate) | | | | | | | 18.32 | 18.32 |
| Kemamide U | 3.99 | 3.99 | 3.99 | 3.99 | | | | |
| Kemamide S | | | | | 5.01 | 5.01 | 5.01 | 5.01 |
| Total | 100.00 | 100.00 | 100.00 | 100.00 | 100.00 | 100.00 | 100.00 | 100.00 |
| Room Temperature Property | | | | | | | | |
| Specific Gravity (g/cm³) | 0.96 | 0.96 | 0.97 | 0.97 | 0.94 | 0.94 | 0.95 | 0.96 |
| Hardness A, 5 sec. | 67 | 58 | 70 | 63 | 71 | 64 | 63 | 64 |
| EB, % | 430 | 286 | 270 | 260 | 460 | 410 | 120 | 130 |
| UTS, MPa (psi) | 4.62 (670) | 3.10 (450) | 4.34 (630) | 3.65 (530) | 4.89 (710) | 4.69 (680) | 4.48 (650) | 3.65 (530) |
| Mod. 100, MPa (psi) | 2.07 (300) | 2.34 (340) | 2.89 (420) | 2.96 (430) | 2.27 (330) | 3.10 (450) | 3.93 (570) | 3.10 (450) |
| Tension Set, % | 16 | 25 | 25 | 31 | 23 | 29 | 32 | 37 |
| A.C.R. viscosity, Pa · s (poise) 204° C., 0.351 MPa (51 psi) | 330 (3300) | 190 (1900) | 220 (2200) | 140 (1400) | 46 (460) | 36 (360) | 21 (210) | 14 (140) |
| Extrusion Surface Rating | 116 | 53 | 82 | 37 | 101 | 45 | 87 | 61 |

TABLE 2

Star-Branched Butyl Rubber/PP TPVs

| Sample Ingredients | 9 wt. % | 10 wt. % | 11 wt. % | 12 wt. % | 13 wt. % | 14 wt. % | 15 wt. % | 16 wt. % |
|---|---|---|---|---|---|---|---|---|
| Exxon Bromobutyl 2244 Rubber | 39.46 | | 39.46 | | 39.46 | | 39.46 | |
| Exxon Br-SBB-6255 Rubber | | 39.46 | | 39.46 | | 39.46 | | 39.46 |
| Aristech TI 4007G Polypropylene | 18.98 | 18.98 | | | | | | |
| Exxon PP7032 Polypropylene | | | 18.98 | 18.98 | | | | |
| Lyondell 51S07A Polypropylene | | | | | 18.98 | 18.98 | | |
| Aristech D008M Polypropylene | | | | | | | 18.98 | 18.98 |
| Exxon Escorez 5320 Hydrocarbon | 6.51 | 6.51 | 6.51 | 6.51 | 6.51 | 6.51 | 6.51 | 6.51 |
| Translink 37 Clay | 1.89 | 1.89 | 1.89 | 1.89 | 1.89 | 1.89 | 1.89 | 1.89 |
| Maglite D MgO | 0.79 | 0.79 | 0.79 | 0.79 | 0.79 | 0.79 | 0.79 | 0.79 |
| Stearic Acid F 1000 | 0.39 | 0.39 | 0.39 | 0.39 | 0.39 | 0.39 | 0.39 | 0.39 |
| Irganox 3114 | 0.20 | 0.20 | 0.20 | 0.20 | 0.20 | 0.20 | 0.20 | 0.20 |
| Ultranox 626 | 0.39 | 0.39 | 0.39 | 0.39 | 0.39 | 0.39 | 0.39 | 0.39 |
| Exxon Parapol 950 | 25.37 | 25.37 | 25.37 | 25.37 | 25.37 | 25.37 | 25.37 | 25.37 |
| ZnO | 1.59 | 1.59 | 1.59 | 1.59 | 1.59 | 1.59 | 1.59 | 1.59 |
| Aristech FP200F Polypropylene | 2.84 | 2.84 | 2.84 | 2.84 | 2.84 | 2.84 | 2.84 | 2.84 |
| Exxon Vistalon 808 | 0.71 | 0.71 | 0.71 | 0.71 | 0.71 | 0.71 | 0.71 | 0.71 |
| DuPont HVA-2 (N,N-m-phenylene dimaleimide) | 0.74 | 0.74 | 0.74 | 0.74 | 0.74 | 0.74 | 0.74 | 0.74 |
| Lyondell ArcoPrime 350 White Oil | 0.12 | 0.12 | 0.12 | 0.12 | 0.12 | 0.12 | 0.12 | 0.12 |
| Total (%) | 100.00 | 100.00 | 100.00 | 100.00 | 100.00 | 100.00 | 100.00 | 100.00 |
| Room Temperature Property | | | | | | | | |
| Specific Gravity (g/cm³) | 0.96 | 0.96 | 0.96 | 0.96 | 0.96 | 0.96 | 0.96 | 0.96 |
| Hardness A, 5 sec. | 74 | 74 | 74 | 74 | 77 | 77 | 80 | 80 |
| EB, % | 360 | 360 | 230 | 230 | 320 | 310 | 210 | 210 |
| UTS, MPa (psi) | 6.89 (1000) | 7.58 (1100) | 5.86 (850) | 6.89 (1000) | 8.96 (1300) | 8.62 (1250) | 7.58 (1100) | 7.58 (1100) |
| Mod. 100, MPa (psi) | 3.31 (480) | 4.20 (610) | 4.07 (590) | 3.93 (570) | 5.31 (770) | 5.38 (780) | 5.93 (860) | 5.93 (860) |
| Tension Set, % | 18 | 20 | 28 | 22 | 22 | 26 | 25 | 25 |
| A.C.R. viscosity, Pa · s (poise) 204° C., 0.351 MPa (51 psi) | 100 (1000) | 80 (800) | 50 (500) | 40 (400) | 86 (860) | 70 (700) | 83 (830) | 58 (580) |
| Extrusion Surface Rating | 132 | 54 | 72 | 54 | 120 | 69 | 107 | 69 |

In a third series of experiments a 1.6 l Banbury internal mixer was used as mixing device. Again, both star-branched halobutyls gave final products with higher tensile strength and elongation compared to the corresponding normal halobutyls.

Processability of finished products with star-branched polymers was significantly better vs. formulation with normal halobutyls. In fact, injection molded plates obtained from both star halobutyl based finished products, presented a smoother surface without flow marks compared to those based on normal halobutyls (sample 17 and 18 vs. control 1 and 2).

The quality of extrusion was much better (smoother) for both star halobutyl based product compared to normal halobutyl (sample 17 and 18 vs: control 1 and 2). The results are shown in the following Table 3:

TABLE 3

Physical properties

| | | Sample | | |
|---|---|---|---|---|
| Ingredients | Control 1 wt. % | 17 wt. % | 18 wt. % | Control wt. % |
| BB 2244 | 35.68 | | | |
| MDB 90/4 | | 35.68 | | |
| MDB 88/4 | | | 35.68 | |
| CB 1068 | | | | 35.68 |
| PPH 1050 | 14.80 | 14.80 | 14.80 | 14.80 |
| Neutral 600 | 34.50 | 34.50 | 34.50 | 34.50 |
| Translink 37 | 1.99 | 1.99 | 1.99 | 1.99 |
| SRF 762 | 2.00 | 2.00 | 2.00 | 2.00 |
| Maglite D | 0.45 | 0.45 | 0.45 | 0.45 |
| Stearic Acid | 0.45 | 0.45 | 0.45 | 0.45 |
| Irganox 3114 | 0.10 | 0.10 | 0.10 | 0.10 |
| Ultranox 626 | 0.18 | 0.18 | 0.18 | 0.18 |
| ZnO | 2.00 | 2.00 | 2.00 | 2.00 |
| HVA-2 | 0.85 | 0.85 | 0.85 | 0.85 |
| Unislip 1757 | 1.00 | 1.00 | 1.00 | 1.00 |
| Vistalon 808 | 6.00 | 6.00 | 6.00 | 6.00 |
| Total | 100% | 100% | 100% | 100% |
| Hardness Shore A 5, sec. | 63 | 63 | 63 | 61 |
| Direction 115 mm | | | | |
| Mod 100, MPa | 2.7 | 2.6 | 2.6 | 1.8 |
| Mod 300, MPa | | 5.7 | | |
| EB% | 277 | 307 | 200 | 130 |
| UTS, MPa | 5.5 | 5.9 | 4.3 | 3.1 |
| Direction 85 mm | | | | |
| Mod 100, MPa | 2.4 | 2.3 | 2.3 | 2.4 |
| Mod 300, MPa | | 5.3 | | |
| EB% | 286 | 331 | 232 | 165 |
| UTS, MPa | 5.3 | 5.9 | 4.5 | 3.5 |
| Tear (N/mm) | | | | |
| direction 115 mm | 25 | 24 | 24 | 20 |
| direction 85 mm | 23 | 23 | 22 | 20 |
| Compression Set % | | | | |
| 22 hrs, RT | 28 | 29 | | |
| 22 hrs, 70° C. | 36 | 35 | | |
| Processability Haake RPM 60 Garvey Die Temp. 170/190/200/190° C. Rating | | | | |
| Surface | rough | smooth | smooth | very rough |
| Edge | rough | smooth | smooth | very rough |
| Lip | tearing | no tearing | no tearing | tearing |
| Injection Plate Surface | flow marks | no flow marks | no flow marks | a lot of flow marks |

The following typical procedures were used in carrying out the examples of this invention:

The procedure to make samples 1 to 16 is illustrated by use of a Werner & Pfleiderer twin-screw extruder type ZSK-53. All of the plastic, rubber and other compounding ingredients except curing system are fed into the entry port of the extruder. In the first third of extruder, the composition is masticated to melt the plastic and to form an essentially homogeneous blend. Curing system is added through another entry port (vulcanization zone) located about one-third of the length of the barrel downstream from the initial entry port. A vent operating under reduced pressure is located near the outlet to remove any volatile by-products. Process oil and other additives are added at another entry port located about the middle of the vulcanization. The additives which could reduce the curing system activity like stabilizers are added downstream after vulcanization zone, close to outlet. Temperature set: 170° C. (feeding zone), 175° C., 180° C., 190° C., 200° C. (die zone). Final melt blend is pelletized under water.

The samples 17, 18 and controls 1, 2 are made using an internal mixer type Banbury.

Into a 1.6 l Banbury internal mixer using about 70% of theoretical volume maintained at 160° C., the rubber, thermoplastic, all the additives except ZnO, HVA-2 and process oil are added and mixed about 3 minutes keeping the temperature at about 180 to 200° C. On third of process oil is added while continuing mixing for about another minute. Then the second third of the process oil is added while continuing to mix for another minute. Then curatives (ZnO, HVA-2) are added. After about 3 minutes mixing the last third of process oil is added. The mixed formulation was then discharged after two minutes of the last addition from the mixer and passed through a cold roll-mill to make a sheet. The sheet was ground into flakes and flakes were subsequently used for making plaques by injection molding or for extrusion processing.

What is claimed is:

1. A thermoplastic elastomer vulcanizate obtained from a curable composition comprising a blend of
   (i) a thermoplastic polyolefin resin selected from homopolymers or copolymers of monoolefin monomers having from 2 to 7 carbon atoms; and
   (ii) a curable star-branched rubber (copolymer) obtained from the reaction of a $C_4$ to $C_7$ isomonoolefin and a $C_4$ to $C_{14}$ multiolefin with a branching agent, by curing the rubber under conditions of shear at a temperature above the melting temperature of the thermoplastic component.

2. The thermoplastic elastomer vulcanizate of claim 1 comprising
85 to 99.5% by weight of the $C_4$ to $C_7$ isomonoolefin, and
0.5 to 15.0% by weight of the $C_4$ to $C_{14}$ multiolefin, based on the amount of isomonoolefin and multiolefin monomers.

3. The thermoplastic elastomer vulcanizate of claim 1 wherein the amount of the branching agent is between 0.5 and 5.0% by weight, based on the amount of the isomonoolefin and multiolefin monomers.

4. The thermoplastic elastomer vulcanizate of claim 1 wherein the star-branched rubber is a copolymer of isobutylene and isoprene including a branching agent.

5. The thermoplastic elastomer vulcanizate of claim 1 wherein the star-branched rubber is halogenated with chlorine, bromine or iodine.

6. The thermoplastic elastomer vulcanizate of claim 5 wherein the star-branched rubber comprises between 0.05 and 5.0% by weight, based on said rubber, of chemically bound halogen.

7. The thermoplastic elastomer vulcanizate of claim 1 comprising 15 to 80% by weight of the thermoplastic polyolefin resin (i), and 85 to 20% by weight of the star-branched rubber (ii), based on the total amount of (i) and (ii).

8. The thermoplastic elastomer vulcanizate of claim 1 wherein the star-branched rubber is partially or fully cured.

9. The thermoplastic elastomer vulcanizate of claim 1 comprising additives are selected from reinforcing and non-reinforcing fillers plasticizers, antioxidants, stabilizers, compatibilizers, rubber processing oil, extender oils, lubricants, antiblocking agents, antistatic agents, waxes, foaming agents, pigments, flame retardants and other conventional processing aids.

10. A method for preparing a thermoplastic elastomer vulcanizate from a curable composition comprising
   (i) a thermoplastic polyolefin resin selected from homopolymers or copolymers of monoolefin monomers having from 2 to 7 carbon atoms;
   (ii) a curable star-branched rubber (copolymer) obtained from the reaction of a $C_4$ to $C_7$ isomonoolefin and a $C_4$ to $C_{14}$ multiolefin with a branching agent; and
   (iii) a curative for said rubber by blending said curable composition under conditions of shear at a temperature above the melting temperature of the thermoplastic component.

11. The method of claim 10, wherein the blending step is carried out until the curable rubber is fully cured.

12. A shaped article comprising a thermoplastic elastomer vulcanizate obtained from a curable composition comprising a blend of
   (i) a thermoplastic polyolefin resin selected from homopolymers or copolymers of monoolefin monomers having from 2 to 7 carbon atoms; and
   (ii) a curable star-branched rubber (copolymer) obtained from the reaction of a $C_4$ to $C_7$ isomonoolefin and a $C_4$ to $C_{14}$ multiolefin with a branching agent, by curing the rubber under conditions of shear at a temperature above the melting temperature of the thermoplastic component.

* * * * *